United States Patent [19]
Starck et al.

[11] Patent Number: 5,920,419
[45] Date of Patent: Jul. 6, 1999

[54] QUANTUM WELL ELECTRO-OPTICAL MODULATOR

[75] Inventors: Christophe Starck, Ste Genevieve Des Bois; Dominique Lesterlin, Vitry Sur Seine, both of France

[73] Assignee: Alcatel Alsthom Compagnie Generale D'Electricite, Paris, France

[21] Appl. No.: 08/847,629

[22] Filed: Apr. 28, 1997

[30] Foreign Application Priority Data

Apr. 29, 1996 [FR] France ................................. 96 05371

[51] Int. Cl.⁶ ........................................................... G02F 1/03
[52] U.S. Cl. ............................................................... 359/248
[58] Field of Search ............................................... 359/248

[56] References Cited

U.S. PATENT DOCUMENTS 5,105,301  4/1992  Campi ...................................... 359/248

OTHER PUBLICATIONS

I. Kotaka et al, "High–Speed InGaAs/InAlAs Multiple–Quantum–Well Optical Modulator", *Electronics and Communications in Japan, Part 2(Electronics)* Jun. 1992, vol. 75, No. 6, pp. 24–31.

T. H. Wood,"Multiple quantum well (MQW) waveguide modulators", *Journal of Lightwave Technology*, vol. 6, No. 6, pp. 743–757 Jun. 1988.

*Primary Examiner*—Georgia Epps
*Assistant Examiner*—Evelyn A. Lester
*Attorney, Agent, or Firm*—Sughrue, Mion, Zinn, Macpeak & Seas, PLLC

[57] ABSTRACT

In order to operate at high frequencies and at high optical powers without reducing the possible depth of modulation, a quantum well electro-optical modulator has a semiconductor structure of III–V elements including, in succession, an n doped layer, an undoped layer, a quantum well active layer and a p doped layer. Applications include optical transmission systems.

10 Claims, 4 Drawing Sheets

QUANTUM WELL ELECTRO-OPTICAL MODULATOR

BACKGROUND OF THE INVENTION

1. Field of the Invention

The invention concerns opto-electronic components and more particularly semiconductor electro-optical modulators.

2. Description of the Prior Art

These components are used in fiber optic transmission systems. For example, they form part of the transmitters in which they are used to modulate the power or the phase of an optical carrier wave. A power modulator associated with a laser source, for example in the form of a laser with built-in modulator, can be used to modulate the power. Phase modulators in an interferometer-type structure such as a Mach-Zehnder structure can also be used to modulate the power.

Electro-optical modulators are routinely fabricated on a III–V element substrate with a "p-i-n" structure, i.e. including in succession the substrate doped to obtain n type conductivity, an undoped active layer and a layer doped to obtain p type conductivity. The whole is reverse biased by an electrical control voltage modulated in accordance with the data to be transmitted.

To reduce the amplitude of the control voltage, an active layer having a "quantum well" structure formed of a succession of wells and potential barriers is generally used.

Modulators having this structure can be used as power modulators or as phase modulators. In the first case, the control voltage is essentially intended to modulate the absorption of optical power in the active layer. In the second case, the voltage modulates the refractive index of this layer.

In order to improve the performance of optical transmission systems, research is in progress on modulators capable of operating at very high bit rates, for example at 40 Gbit/s. It is therefore necessary to design modulators capable of operating at high frequencies whilst assuring the greatest possible depth of modulation of the optical wave, to allow correct detection at the receivers. The modulators must also be capable of modulating a carrier wave of high optical power, for example in the order of 10 mW.

The p-i-n structure mentioned above has two kinds of limitation. The first is due to a saturation phenomenon which reduces the extinction rate of power modulators if the input optical power to be modulated increases. A similar saturation phenomenon also occurs in phase modulators, in the form of a reduction in the depth of modulation of the index. In quantum well structures this saturation is the result of an accumulation of holes in the wells which reduces the electric field in the wells. This greatly reduces the bandwidth of the modulator if the optical power increases because of an increase in the time for which holes are trapped in the wells.

A second bandwidth limitation, occurring even at very low optical powers, is caused by stray capacitances of the structure employed. They are due in part to the capacitance of the p-i-n junction between the two electrodes of the component.

In order to improve the saturation power, it has been proposed to produce modulators using multiple quantum wells having confined voltage barriers. This solution increases the saturation power by reducing the time for which holes are trapped in the wells.

Another solution is to make modulators of very short length, less than 100 μm, for example, but the improvement in bandwidth is achieved to the detriment of the depth of modulation.

It is feasible to increase the thickness of the active layer by increasing the number of wells constituting it to limit the stray capacitance due to the p-i-n junction. This solution does reduce the capacitance but it leads to an increase in absorption losses of the modulator in its transparent state. This drawback also occurs in the case of the multiple quantum well structure having confined voltage barriers previously mentioned.

An aim of the invention is to provide the optimum solution to the previous two problems.

SUMMARY OF THE INVENTION

To this end, the invention consists in an electro-optical modulator having two electrodes disposed one on each side of a semiconductor structure formed on an III–V element substrate and comprising:

- a first layer made of said III–V elements and doped to have n type conductivity,
- a second layer made of said III–V elements and doped to have p type conductivity, and
- an active layer between said first and second layers and comprising a succession of quantum wells and potential barriers,
- wherein, to reduce the electrical capacitance between said electrodes, there is a third layer made of undoped III–V elements between said active layer and said first layer.

As explained in detail in the remainder of the description, the position of the third layer in the semiconductor structure is decisive in regard of the saturation phenomenon at high optical powers.

To minimize optical losses, the third layer should have a composition such that it is transparent at the wavelength of the waves to be modulated by the modulator.

In one particular embodiment, the third layer is made of the same elements as the substrate. This solution simplifies the fabrication process.

In one particular implementation, the third layer is in direct contact with the active layer and the first layer.

Other aspects and advantages of the invention will emerge from the remainder of the description, which is given with reference to the accompanying drawings.

DETAILED DESCRIPTION OF THE PREFERRED EMBODIMENTS

Figure 1:
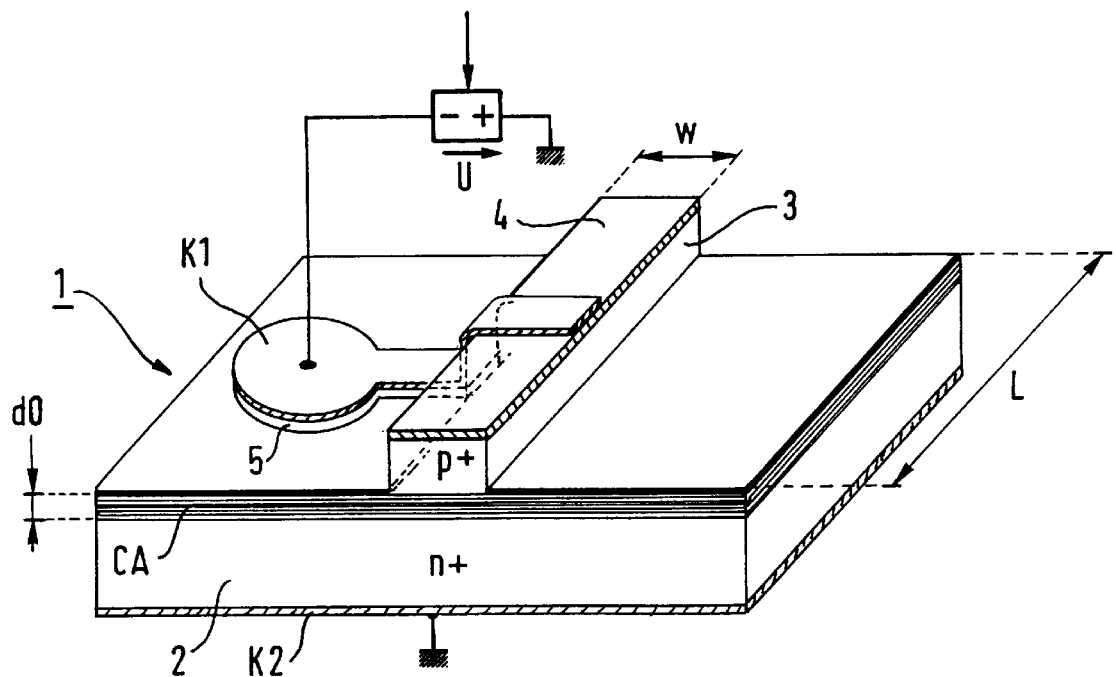
FIG. 1 shows a prior art electro-optical modulator.

FIG. 1 is a schematic representation of a conventional structure semiconductor electro-optical modulator. It is made on a III–V element, for example indium phosphide, substrate. The semiconductor structure essentially comprises a n doped first layer, generally consisting of the substrate, an active layer CA and a p doped second layer 3.

The example shown has a "ridge" structure in which the second layer 3 is etched laterally to leave only a strip of width w which defines the width of the optical waveguide. The active layer CA comprises a plurality of quantum wells separated by potential barriers. The first layer 2 is covered by a metalization layer to form a bottom electrode K2. The second layer 3 is covered through the intermediary of a contact layer by another metalization layer 4 in electrical contact with a terminal K1 on the component beside the ridge. The terminal K1 is insulated from the active layer CA by a dielectric layer 5 of sufficient thickness to reduce the stray capacitance between the contact K1 and the bottom electrode K2.

To operate as a modulator, the component is reverse biased by a voltage U that can be modulated about a mean value. The stay capacitance due to the semiconductor structure proper is essentially conditioned by the thickness of the depleted layers, i.e. by the thickness d0 of the active layer CA.

To be more precise, the capacitance Co is given by the formula Co=ϵLw/d0, where:

ϵ is the permitivity of the active layer,

L is the length of the component, w is the width of the waveguide, d0 is the thickness of the active layer.

Accordingly, allowing for only this capacitance, the cut-off frequency f0 of the modulator loaded by a resistance R is:

$$f0 = \frac{1}{2\pi RCo} = d0/(2\pi R\epsilon Lw)$$

If the thickness of the depleted layer is increased by an amount d1, the new cut-off frequency is given by the formula:

$$f1 = f0(1 + d1/d0)$$

Figure 2:
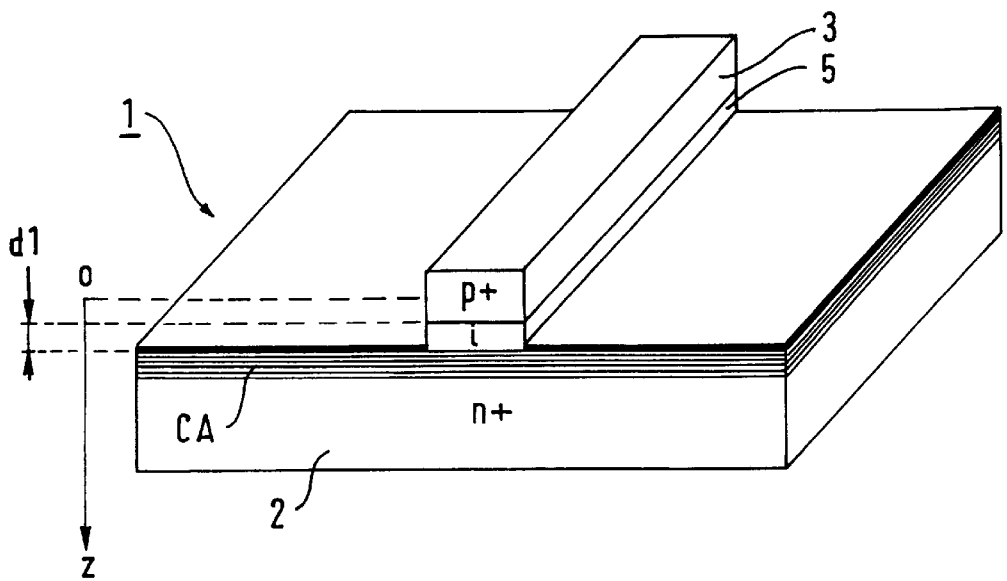
FIG. 2 shows a semiconductor structure modified to reduce the capacitance.

The structure can be modified as shown in FIG. 2 to obtain this result. As shown, an undoped layer 5 of thickness d1 is placed between the active layer CA and the top layer 3. The choice of this arrangement may be guided by the fact that it is beneficial to move the active layer CA away from the nearer electrode, i.e. the one in contact with the top layer. The composition of the layer 5 is advantageously chosen to assure transparency to the waves to be modulated by the component. The simplest choice is to use the same composition as the substrate, which ensures that the optical properties are not modified in any way by this additional layer.

The choice of the thickness dl will naturally depend on the required bandwidth improvement. By making d1 at least half d0, the improvement will be better than 50%. Moreover, it is possible to define a maximal limit value of the thickness dl allowing for the fact that the value of the capacitance depends only on the total thickness of the depleted layer, this thickness depending on the voltage applied between the electrodes of the component.

Figure 3:
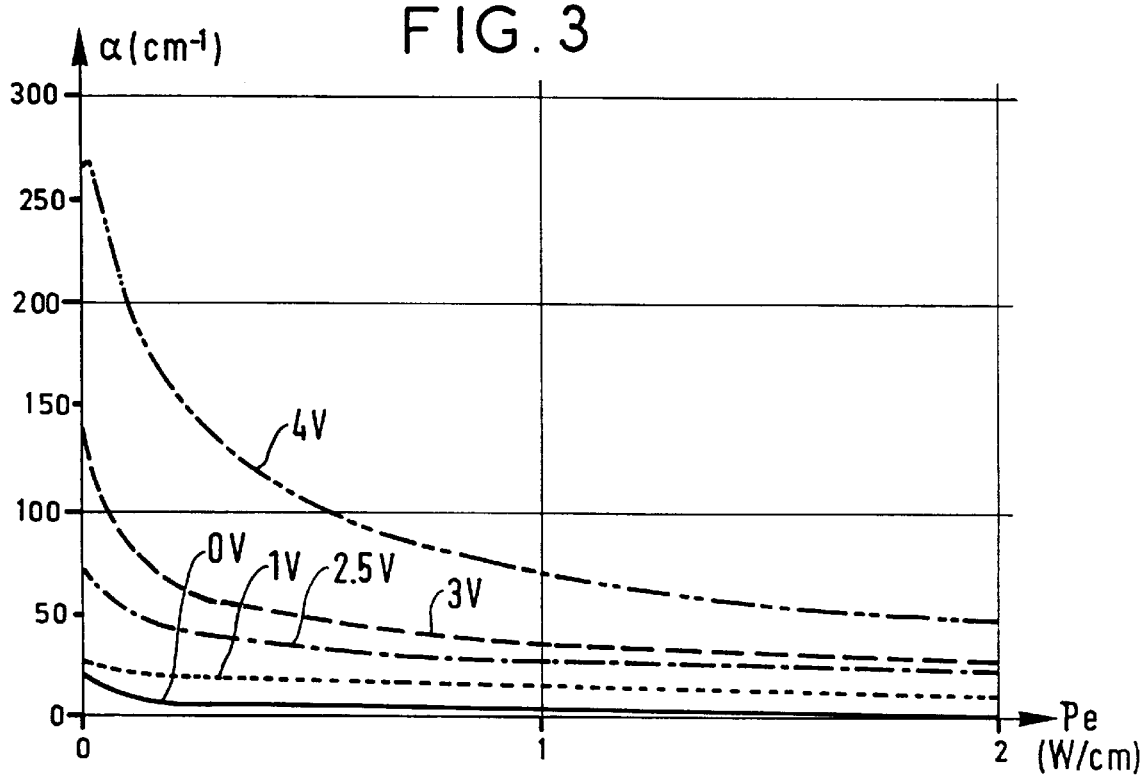
FIG. 3 shows the variations of the absorption coefficient as a function of the input optical power in the structure from FIG. 2.

Turning now to the phenomenon of saturation of absorption at high power, consider the variations of the absorption coefficient as a function of the injected optical power for different values of the bias voltage U. FIG. 3 shows the variations of the absorption coefficient α as a function of the input optical power Pe in the structure from FIG. 2. The absorption coefficient α is defined as the relative decrease in optical power transmitted by the active layer per unit propagation length in that layer. On the abscissa axis, Pe is the optical power per unit width of the waveguide. Here the power Pe is expressed in W/cm and the absorption in $cm^{-1}$. The figure shows five curves that correspond to bias voltages U respectively equal to 0 V, 1 V, 2.5 V, 3 V and 4 V.

If a voltage U modulated between 1 V and 4 V, for example, is applied, a significant deterioration of the extinction rate is observed if the optical power Pe increases.

To explain this phenomenon, it is necessary to consider the energy band diagrams for the structure concerned.

Figure 4:
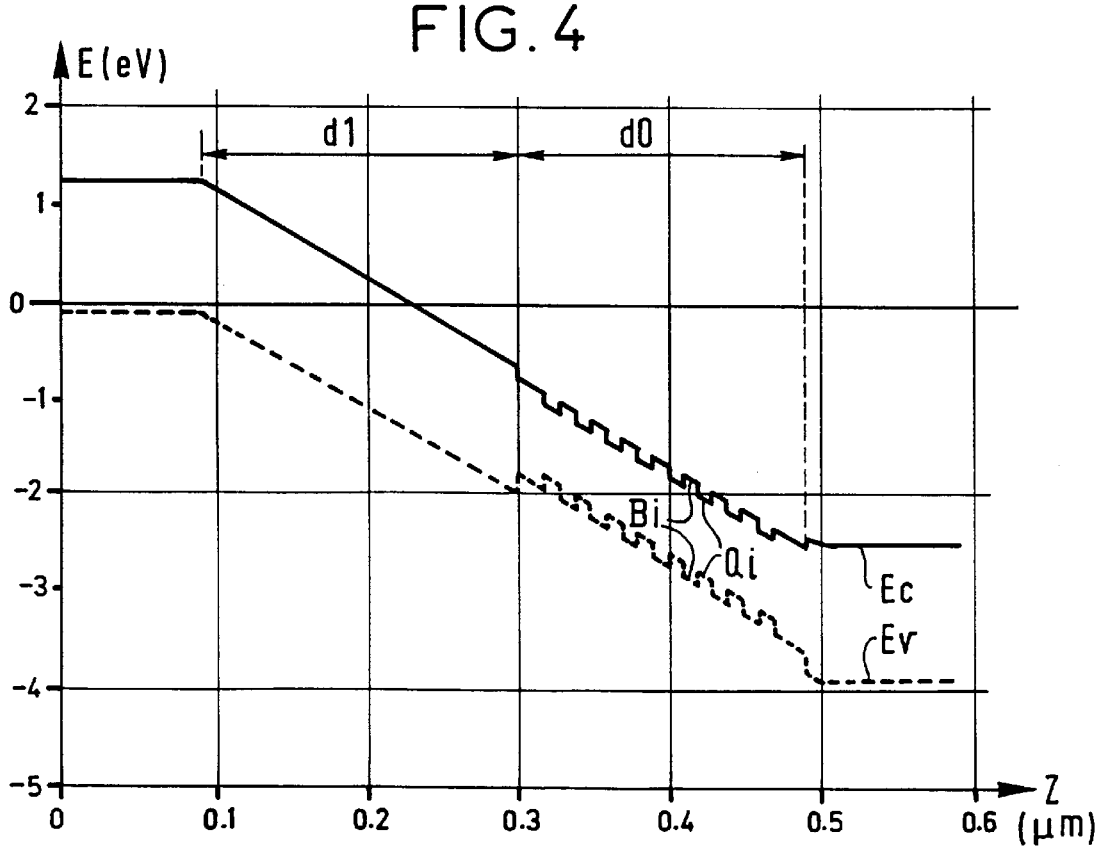
FIG. 4 is a diagram of zero-point optical power energy bands for the structure from FIG. 2.

FIG. 4 shows an energy band diagram in the case where the input optical power is at the zero-point. The figure shows the bottom of the conduction band Ec and the top of the valence band Ev as a function of the vertical position z in the structure from FIG. 2. The ordinate axis E represents the energy of the electrons expressed in electron volts, the zero-point energy level corresponding to the Fermi level of the top layer 3. The curves correspond to the case in which U=2.5 V.

The figure shows how the levels Ec and Ev evolve from a reference point in the layer 3 (left-hand part of the curve) towards the layer 2 (right-hand part of the curves). The levels Ec and Ev vary linearly in the undoped layer 5 and are then subject to periodic variations in the quantum well structure of the active layer CA. In the example shown, the active layer CA includes eight quantum wells Qi separated by potential barriers Bi.

The absorption efficiency of the component is directly related to the amplitude of the electrical field present in the quantum wells of the active layer. This amplitude corresponds to the slope of the curve Ec in the wells. As can be seen from FIG. 4, when the input optical power is at the zero-point, the amplitude of the field is constant.

Figure 5:
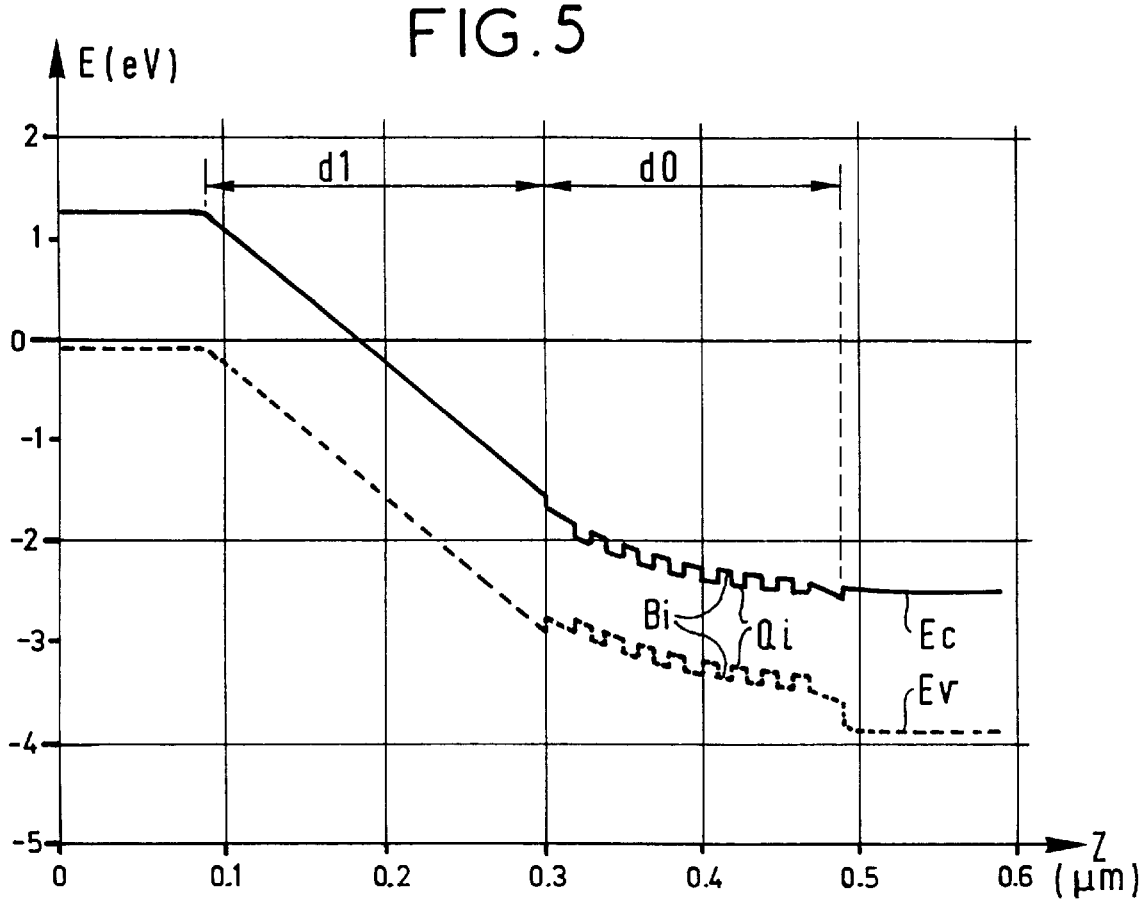
FIG. 5 shows how the energy band diagram is modified for a high optical power.

On the other hand, if a high optical power, for example in the order of 2 W/cm, is introduced into the active layer of the modulator, the curves Ec and Ev are subject to a deformation like that shown in FIG. 5. The mean amplitude of the electric field in the quantum well is reduced, which explains the absorption saturation phenomenon.

Figure 6:
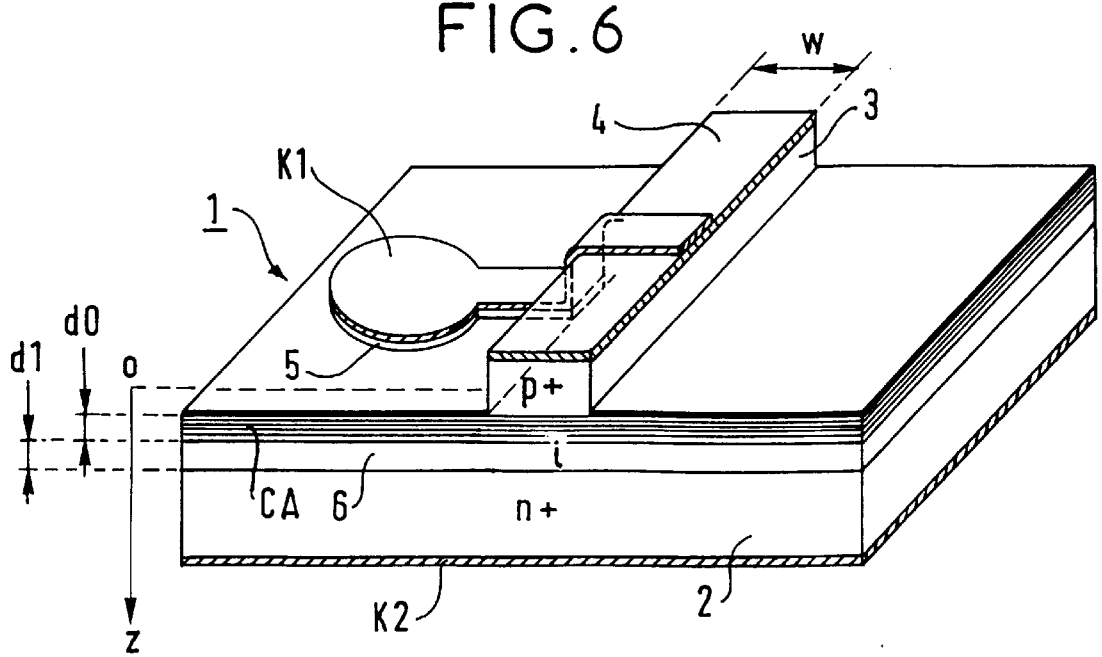
FIG. 6 shows a semiconductor structure in accordance with the invention.

FIG. 6 shows another semiconductor structure in which there is an undoped layer 6 between the active layer CA and the first layer 2.

Figure 7:
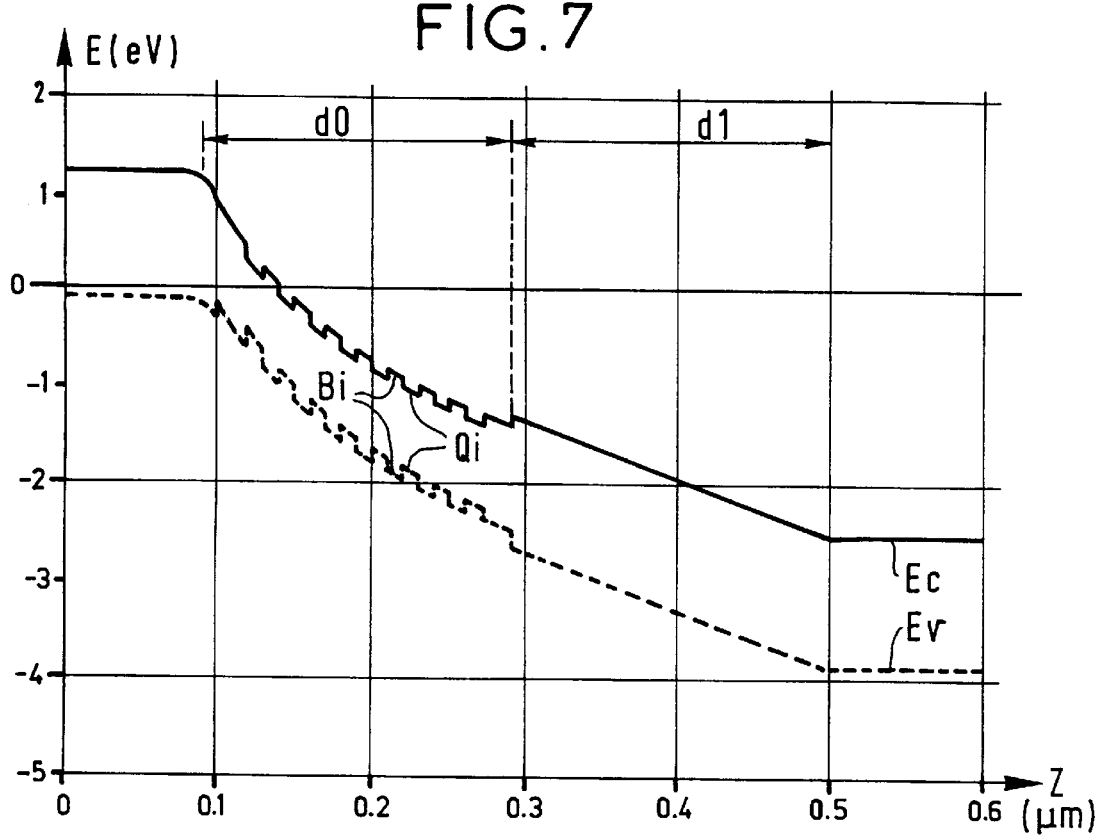
FIG. 7 is an energy band diagram for the structure from FIG. 6 and for a high optical power.

FIG. 7 shows the energy band diagram for the structure from FIG. 6. This diagram corresponds to the same applied optical power as FIG. 5. It can be seen that the curves Ec and Ev are subject to a deformation which implies an increase in the amplitude of the electric field in the quantum wells, which should favor absorption efficiency.

Figure 8:
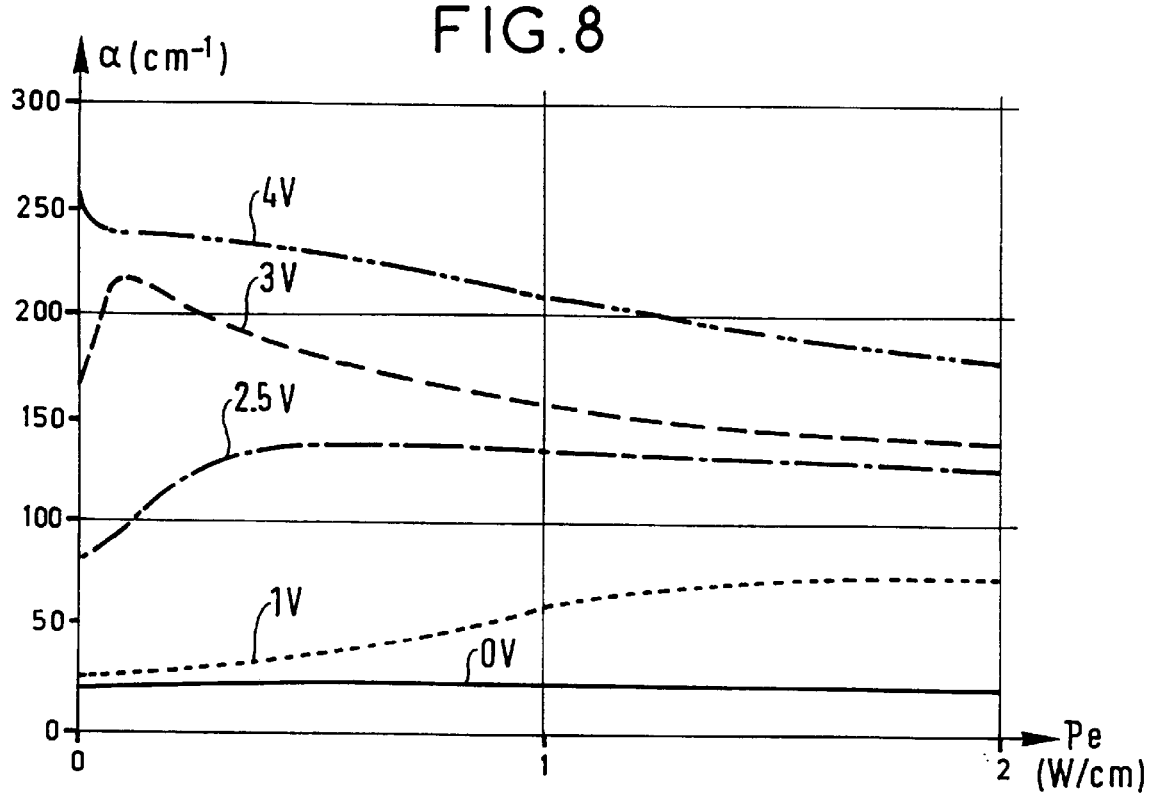
FIG. 8 is a diagram showing the variations in the absorption coefficient as a function of the optical power in the structure from FIG. 6.

The expected improvement can be verified by plotting the values of the absorption coefficient α as a function of the input optical power Pe for this latter structure. FIG. 8 shows the corresponding curves. Comparing the curves from FIG. 8 with the corresponding curves from FIG. 3, an improvement in the extinction rate can be confirmed, for example for a modulation of the voltage U between 1 V and 4 V. The higher the optical power Pe, the better the improvement.

The curves representing the variations of the index n of the active layer as a function of the optical power for the two structures concerned are similar to the curves of FIGS. 3 and 8. Consequently, the structure of the invention also improves phase modulator operation.

By way of illustration, there follow the specifications of a particular implementation that corresponds to the curves just described:

Substrate 2: Si doped InP ($10^{18}$ electrons/$cm^3$)

Layer 3: Be doped InP ($10^{18}$ holes/$cm^3$)

Layer 6: undoped InP (residual doping=$2.10^{15}$ electrons/cm$^3$)

Active layer CA: 8 quantum wells, 9 potential barriers

Wells: $Ga_{0.21}In_{0.79}As_{0.74}P_{0.26}$; thickness: 9 nm

Barriers: $Ga_{0.21}In_{0.79}As_{0.45}P_{0.55}$; thickness: 11 nm

Active layer thickness d0: 0.17 µm

Layer 6 thickness d1: 0.20 µm

Layer 3 thickness: 2.5 µm

Substrate thickness: 100 µm

Component length L: 100 µm–200 µm

Waveguide width w: 3 µm

Control voltage U modulated between 1 V and 4 V

Operating wavelength: 1.55 µm

The invention is not limited to this particular implementation. To the contrary, many variants will suggest themselves to the person skilled in the art. In particular, the invention may use other III–V substrates such as GaAs. Likewise, the number of quantum wells forming the active layer is immaterial. Moreover, the active layer can include one or more optical confinement layers delimiting the quantum wells.

There is claimed:

1. An electro-optical modulator having two electrodes disposed one on each side of a semiconductor structure formed on an III–V element substrate and comprising:
   a first layer made of said III–V elements and doped to have n type conductivity;
   a second layer made of said III–V elements and doped to have p type conductivity;
   an active layer between said first and second layers, adjacent to said second layer, and comprising a succession of quantum wells and potential barriers; and
   a third layer comprising undoped III–V elements provided between said active layer and said first layer reducing the electrical capacitance between said electrodes.

2. The modulator claimed in claim 1 wherein said third layer has a composition such that it is transparent at the wavelengths of the waves to be modulated by said modulator.

3. The modulator claimed in claim 2 wherein said third layer is made of the same elements as said substrate.

4. The modulator claimed in claim 1 wherein said third layer is in direct contact with said active layer and said first layer.

5. The modulator claimed in claim 1 wherein said third layer has a thickness not greater than a thickness limit value such that said undoped layer of said structure are depleted when a minimum operating voltage of said modulator is applied between said electrodes.

6. The modulator claimed in claim 1 wherein said third layer has a thickness at least equal to half the thickness of said active layer.

7. The modulator claimed in claim 1 wherein said substrate is made of indium phosphide.

8. The modulator claimed in any one of claims 1 through 7 wherein said modulator is an optical carrier wave power modulator.

9. The modulator claimed in any of the claims 1–7 wherein said modulator is an optical carrier wave phase modulator.

10. An integrated modulator device comprising:
    laser; and
    an electro-optical modulator connected with said laser having two electrodes disposed one on each side of a semiconductor structure formed on an III–V element substrate including,
    a first layer made of said III–V elements and doped to have n type conductivity,
    a second layer made of said III–V elements and doped to have p type conductivity,
    an active layer between said first and second layers, adjacent to said second layer, and comprising a succession of quantum wells and potential barriers, and
    a third layer comprising undoped III–V elements provided between said active layer and said first layer reducing the electrical capacitance between said electrodes.

* * * * *

UNITED STATES PATENT AND TRADEMARK OFFICE
CERTIFICATE OF CORRECTION

PATENT NO. : 5,920,419
DATED : July 6, 1999
INVENTOR(S) : Christopher Starck, et al.

It is certified that error appears in the above-identified patent and that said Letters Patent is hereby corrected as shown below:

On the title page, change item:

[73] from "Alcatel Alsthom Compagnie Generale D"Electricite, paris, France to:

--Alcatel, Paris, France---.

Signed and Sealed this

Thirteenth Day of June, 2000

Attest:

Q. TODD DICKINSON

*Attesting Officer*   *Director of Patents and Trademarks*